Figure 5:
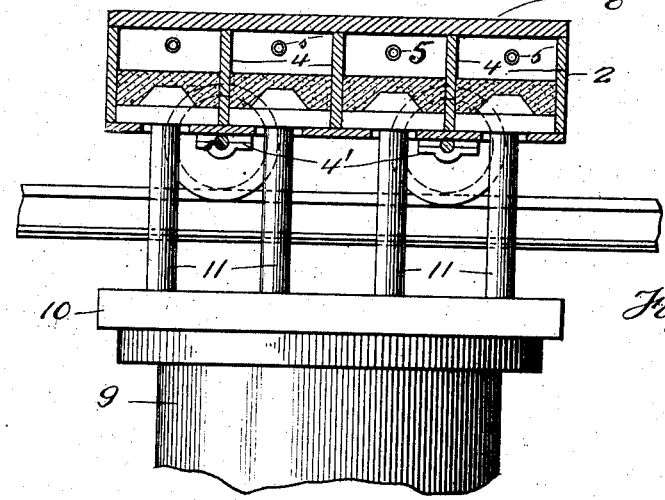

No. 865,266. PATENTED SEPT. 3, 1907.
A. A. PAULY.
APPARATUS FOR FORMING BUILDING BLOCKS AND ARTIFICIAL STONE
FROM PLASTIC MATERIAL.
APPLICATION FILED APR. 30, 1907.
3 SHEETS—SHEET 1.
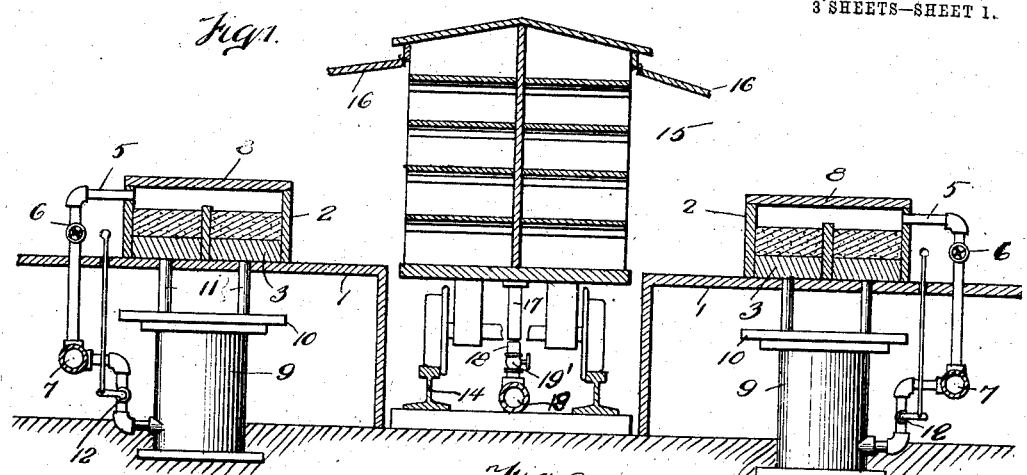
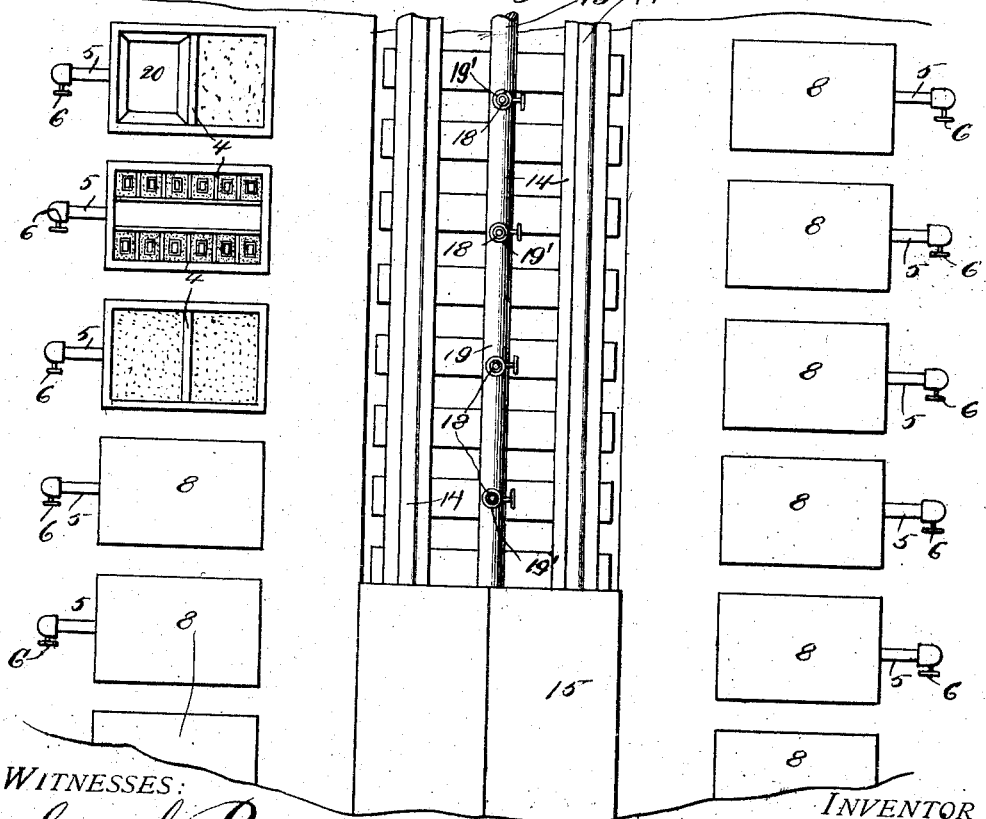
WITNESSES:
Samuel Payne
K. A. Butter
INVENTOR
A. A. Pauly
BY H. C. Evert & Co.
Attorneys No. 865,266. PATENTED SEPT. 3, 1907.
A. A. PAULY.
APPARATUS FOR FORMING BUILDING BLOCKS AND ARTIFICIAL STONE FROM PLASTIC MATERIAL.
APPLICATION FILED APR. 30, 1907.
3 SHEETS—SHEET 2.
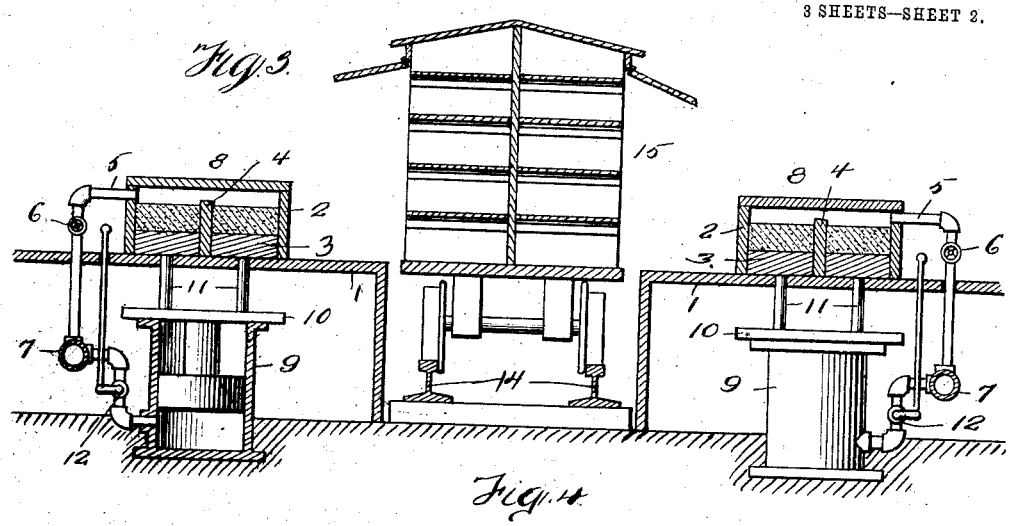
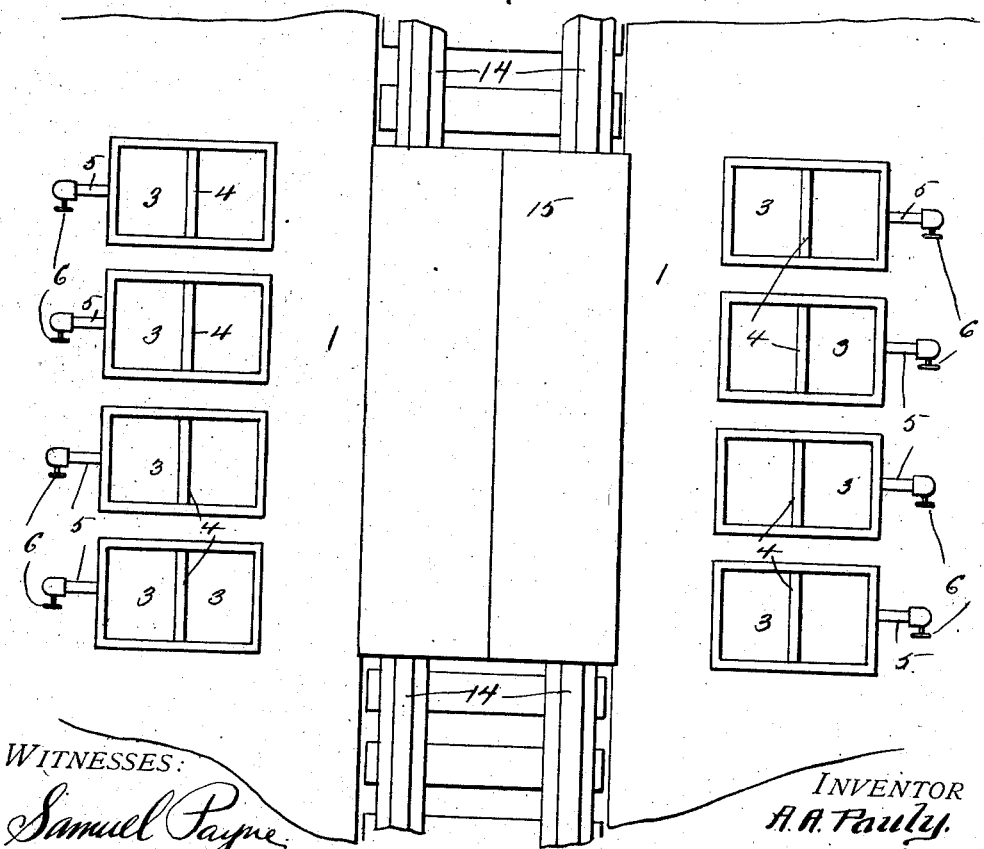
WITNESSES:
Samuel Payne
INVENTOR
A. A. Pauly.
BY
Attorneys No. 865,266. PATENTED SEPT. 3, 1907.
A. A. PAULY.
APPARATUS FOR FORMING BUILDING BLOCKS AND ARTIFICIAL STONE FROM PLASTIC MATERIAL.
APPLICATION FILED APR. 30, 1907.

3 SHEETS—SHEET 3.

WITNESSES:
Samuel Payne
X. H. Butler

INVENTOR
A. A. Pauly.
BY H. C. Everett
Attorneys

UNITED STATES PATENT OFFICE.

ALBERT A. PAULY, OF YOUNGSTOWN, OHIO.

APPARATUS FOR FORMING BUILDING-BLOCKS AND ARTIFICIAL STONE FROM PLASTIC MATERIAL.

No. 865,266.	Specification of Letters Patent.	Patented Sept. 3, 1907.

Application filed April 30, 1907. Serial No. 371,141.

*To all whom it may concern:*

Be it known that I, ALBERT A. PAULY, a citizen of the United States of America, residing at Youngstown, in the county of Mahoning and State of Ohio, have invented certain new and useful Improvements in Apparatus for Forming Building-Blocks and Artificial Stone from Plastic Material, of which the following is a specification, reference being had therein to the accompanying drawing.

This invention relates to improvements in apparatus for forming building blocks and artificial stone from plastic material, and the invention has for its object to provide a novel apparatus for economically and expeditiously producing seasoned blocks and stones having qualifications conducive to immediate use.

My invention aims to provide platforms and molds arranged whereby the molds can be successively used and their contents subjected to the action of steam, to season or "cure" the contents of the molds prior to removing the same. I locate a stripping device contiguous to the molds for removing the contents with considerable rapidity, whereby the partial seasoned blocks or stones can be immediately transferred to a seasoning car adapted to travel adjacent to the platform. The seasoning car, which is commonly styled a "wet stone" car, forms the subject matter of a patent granted to me April 2, 1907, No. 849,160, the car being fitted with steam pipes for subjecting the contents of the car to the action of wet steam for a short period of time, whereby the stones or blocks will be thoroughly hardened, seasoned and provided with sufficient water-proof qualifications to withstand the forces of nature to which they are subjected.

My invention particularly resides in the novel arrangement of the platforms, molds and stripping devices, whereby the production of artificial stones or blocks can be quickly accomplished, thereby not necessitating the period of time generally consumed for producing artificial building blocks and stones.

Figure 6:
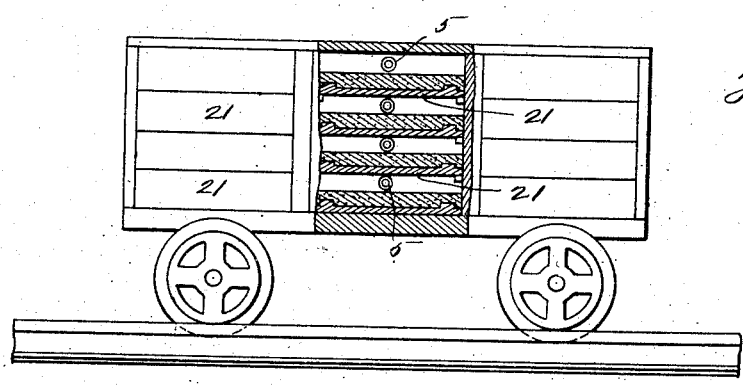
Figure 7:
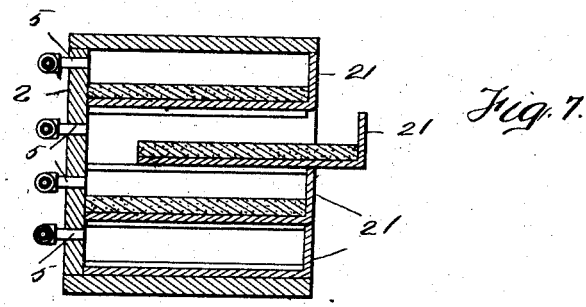

The invention will be hereinafter more fully described in detail with reference to the accompanying drawings, wherein, Figure 1 is a cross sectional view of an apparatus constructed in accordance with my invention, Fig. 2 is a plan of the same, Fig. 3 is a cross sectional view of an apparatus wherein the steam supply line for the wet stone cars is dispensed with, Fig. 4 is a plan of the same, Fig. 5 is a longitudinal sectional view of a movable mold and a mold stripping device, Fig. 6 is an elevation partly in section of a movable mold, Fig. 7 is a cross sectional view of the same.

In the accompanying drawings, 1 designates two parallel platforms or supports for molding frames 2, in which pallets 3 are movably supported, the molding frames being preferably partitioned, as at 4, whereby a plurality of blocks or stones can be formed in each molding frame.

The molding frames illustrated in Figs. 1 to 4 inclusive are stationary and are arranged in a line upon the platforms, whereby said frames can be successively used for the production of artificial blocks or stones. In some instances, these frames can be movably supported, as illustrated in Fig. 5 of the drawings, the frame being carried by a truck 4'. In either instance I provide means for subjecting the contents of the molding frames to the action of steam or some heating medium, whereby while the plastic material is settling in the molding frames, the material can be partially seasoned and placed in condition for more safe handling, at the same time maintaining the material in a condition susceptible to seasoning or curing, as will be presently described. The heating means which I have illustrated consists of providing each molding frame with a steam supply pipe 5 controlled by a suitable valve 6. The steam supply pipes of the molding frames connect with a main steam supply pipe 7, preferably located beneath the platform or support 1 of the molding frames. The molding frames are provided with movable doors 8, that after the plastic material has been placed in the frames, can be closed, the valve 6 opened, and the contents of said frames allowed to season.

To strip the molds or eject the material therefrom after the plastic material has settled, I arrange stripping devices beneath the platforms or supports of the molding frames, these devices in a large plant being operated by steam or air, preferably steam from the main supply pipe 7, while in a small plant the stripping devices can be manually operated. The stripping devices illustrated comprise hydraulic cylinders 9 having heads 10 provided with plungers 11, the heads 10 being moved upwardly to permit of the plungers 11 elevating the pallets 3 within the molding frames 2, and placing the plastic material a sufficient distance above the frames whereby it can easily be removed therefrom. A conventional form of valve 12 is used in connection with each cylinder for controlling the raising and lowering of the plungers 11, rods 12' being connected to the stems of the valves 12 and extended up through the platforms 1, so that the valves may be controlled from the platforms.

As numerous molding frames are used for producing artificial blocks or stones, of various sizes, configurations and constructions, it is necessary that means be provided for rapidly removing the partially finished product. Therefore, I have arranged between the platforms or supports 1 of the molding frames a track 14, upon which seasoning cars 15 can be moved and loaded, either from the frames upon one platform or both. One of the cars which I preferably use is disclosed in my Patent No. 849,160, wherein shelves are arranged upon which the plastic material, either with or without the pallets is placed. The cars are provided with doors 16 which are closed after the cars have been filled, whereby the contents of the cars can be subjected to the action of steam, for rendering the stones and blocks waterproof. I preferably provide the cars with depending spouts 17, which are adapted to aline with nozzles 18, carried by a steam supply pipe 19 located centrally of the track 14. The additional steam supply pipe 19 is provided so that a loaded car waiting to be moved can be supplied with steam, thus furthering the completion of the blocks or stones within the car. Suitable means, as valves 19', can be employed in connection with the nozzles 18 for closing either of the nozzles when not being used. A nozzle is preferably located in front of two oppositely located molding frames, whereby when the apparatus is in full operation, and a number of cars are being loaded, the nozzles can be left open, and as the cars are successively moved forward, the nozzles will aline with the spouts 17 and supply the cars with steam. This may be the continuous method of producing concrete blocks and stones when the molding frames are successively used, from one end of the platforms or supports to the other end.

In Figs. 3 and 4 of the drawings, I have dispensed with the steam supply pipe 19 and use ordinary cars in which the partially finished blocks and stones can be placed, then afterwards subjected to the action of steam or a heating medium in a specially constructed building or kiln. In one of the molding frames, I have illustrated a block 20 being formed having beveled edges, while in other molds I have illustrated hollow concrete blocks and slabs as being formed, therefore, I do not care to confine myself to the configuration of the block or stone produced.

In Figs. 6 and 7, I have illustrated a movable molding frame as having a plurality of movable drawers 21 corresponding to pallets, these drawers being particularly designed for holding plastic material in the form of slabs or plates. The molding frame is also provided with means for subjecting the contents thereof to the action of steam. In the movable molding frames I can allow the plastic material to remain until it has been thoroughly seasoned, and then use a stripping device, as illustrated in Fig. 5 of the drawings, for ejecting the molded material from the molding frames, the location of the stripping device with respect to the plates when the molding frame is filled being immaterial.

Desideratum of apparatus of this type is the production of concrete building blocks and stones with considerable rapidity, therefore I use steam or a suitable heating medium to facilitate the formation of blocks and stones. Otherwise, it requires considerable time to produce a block or stone that meets the requirements of building specifications.

What I claim and desire to secure by Letters Patent, is:—

1. An apparatus of the type described consisting of supports, molding frames arranged upon said supports, doors normally closing said frames, ejectors located beneath said supports and extending into said frames, steam pipes connecting with said ejectors and with said frames, and means for controlling the operation of said ejectors.

2. A plant for forming concrete blocks comprising two parallel spaced platforms, a trackway between the platforms and arranged below the same, a plurality of molding-frames supported on said platforms, a steam supply line, pipes connecting said steam-supply line with each of said molding-frames, and block ejecting means also operated by steam from said steam-supply line for ejecting blocks from said molding-frames.

3. In a concrete block forming apparatus, a supporting platform, a trackway arranged along side and below said platform, a plurality of molding-frames supported on said platform, a steam-supply line located beneath the platform, independent branch-pipes leading from said steam-supply line to each of said molding-frames, and independent ejecting-means for each molding-frame, said ejecting-means being actuated by steam from said steam supply line.

4. Concrete block forming means, comprising a supporting platform, a plurality of molding-frames supported on said platform, a steam supply line beneath the platform, steam pipes connecting said steam-supply line with each of said molding-frames, block-ejecting means for each molding frame comprising a cylinder located beneath the platform having a movable head, plungers carried by said head and projecting through the platform into the molding frame, a piston in said cylinder for engaging said movable head, connections between the cylinder and said steam-supply line, and means operated from the platform for controlling passage of steam from the steam supply line to said cylinder.

5. In concrete block forming apparatus, a supporting platform, a plurality of molding frames supported on said platform, a steam supply line underneath the platform, and independent steam pipes connecting each molding frame with the steam supply line, substantially as described.

6. In a concrete block forming apparatus, a supporting platform, a car-receiving trackway arranged along side the platform and below the same, a steam-supply pipe arranged in said trackway for supplying steam to a car on the trackway, a plurality of molding-frames supported on the platform, and means for independently supplying steam to each of the molding-frames.

In testimony whereof I affix my signature in the presence of two witnesses.

ALBERT A. PAULY.

Witnesses:
W. MEADE CARTER,
W. B. RIBLET.